Figure 1:
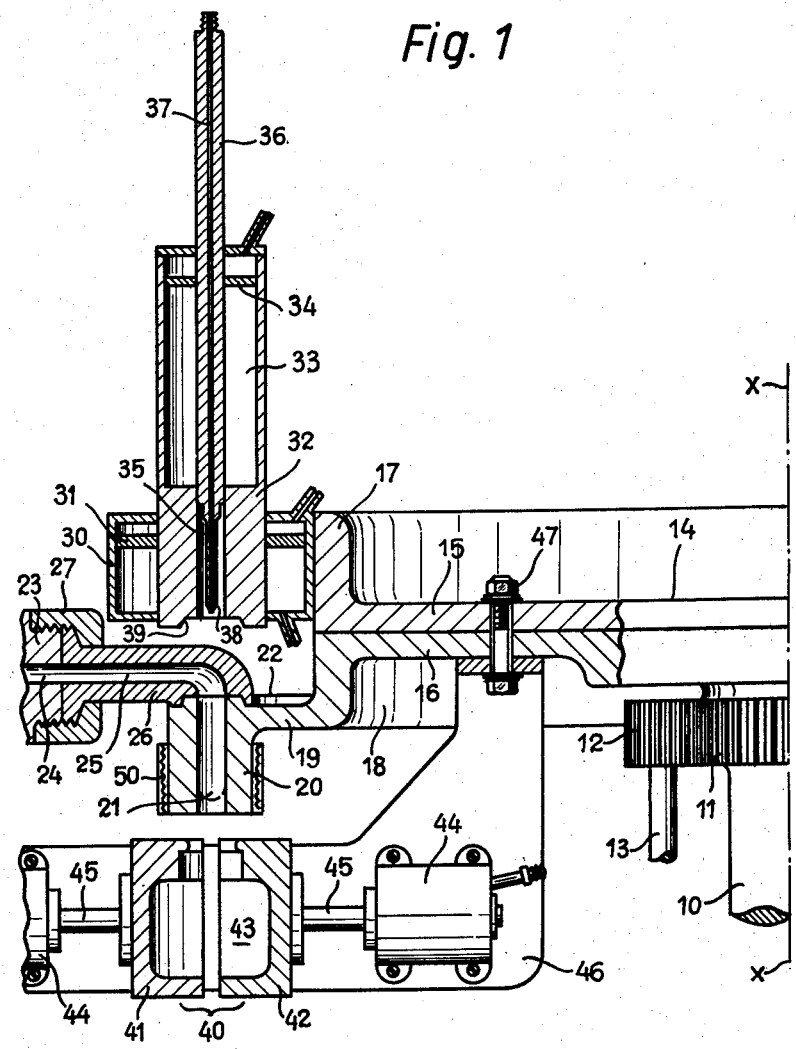

Dec. 1, 1959  R. COLOMBO  2,914,801
METHOD AND APPARATUS FOR MANUFACTURING HOLLOW
ARTICLES OF THERMOPLASTIC MATERIAL
Filed March 12, 1958  2 Sheets-Sheet 2
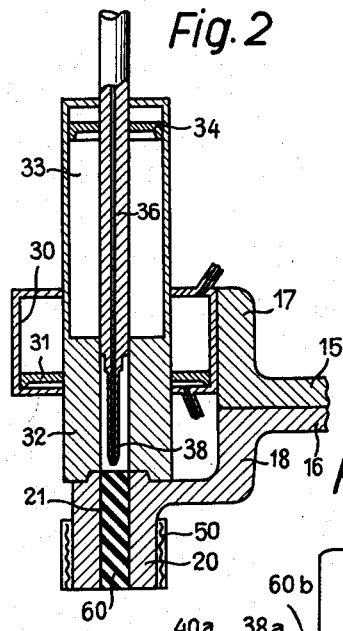
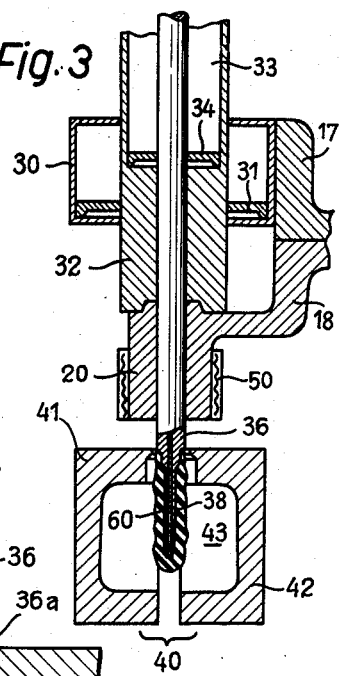
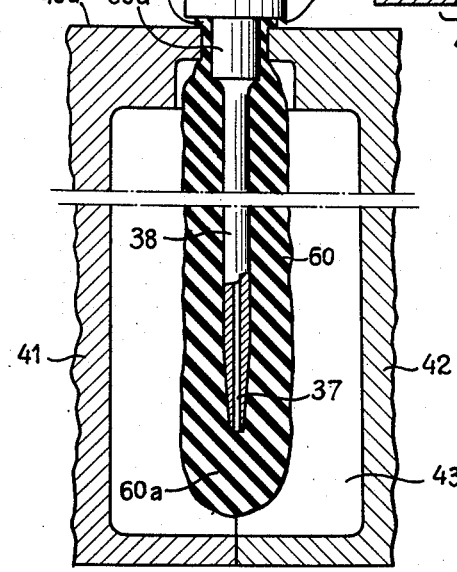

United States Patent Office

2,914,801
Patented Dec. 1, 1959

2,914,801

METHOD AND APPARATUS FOR MANUFACTURING HOLLOW ARTICLES OF THERMOPLASTIC MATERIAL

Roberto Colombo, Turin, Italy, assignor to S. A. S. Lavorazione Materie Plastiche (L.M.P.) di M. I. Colombo & C., Turin, Italy Application March 12, 1958, Serial No. 721,053

Claims priority, application Italy March 16, 1957

6 Claims. (Cl. 18—5)

Methods known heretofore for manufacturing hollow articles of thermoplastic material comprise a step wherein softened thermoplastic material is extruded through an annular nozzle and a further step which, considered in timed relationship, may even overlap the former, by which the extruded pipe section is expanded into a mould by blowing-in compressed air, such as through a perforating needle or a conduit arranged on the longitudinal axis of the annular nozzle.

Such methods are rather well suited for working materials which, in a softened state, are of considerable viscosity, while they are unsuitable for working further materials which, when brought to a softened condition, are highly fluid so that the extruded pipe section collapses and spontaneously breaks by effect of its own weight. The class of the first mentioned materials include for instance polyethylene resins, while the class of the latter materials include polyamide resins. In fact, as is well known to experts in the branch, the manufacture of hollow articles from polyamide resins met heretofore with considerable difficulties ensuing exactly on the high fluidity when hot of such resins.

An object of this invention is to obviate the above drawbacks by providing a method and apparatus for the manufacture of hollow articles from any type of resin even resins which are highly fluid in the hot.

Further objects and features of the invention will be understood from the appended specification referring to the accompanying drawing which is given by way of a non-limiting example, wherein:

Figure 1 is a vertical axial sectional view of the main components of the apparatus, Figures 2 and 3 are fragmentary sectional views of some parts shown in Figure 1 during two steps of the method, and Figure 4 is a sectional view on an enlarged scale of a detail of the apparatus.

On the drawing 10 denotes a tough steel shaft mounted for rotation about its longitudinal axis X—X is vertically orientated. The shaft 10 has keyed thereto a toothed wheel 11 having a pinion 12 meshing therewith, the pinion 12 being connected by its shaft 13 with a motor unit not shown, adapted to intermittently rotate the shaft 10. The shaft 10 has secured to its top for rotation therewith a circular table 14 formed by two superimposed discs 15—16, arranged horizontally.

Figure 1 is a sectional view of the portion of table 14 only which is situated on the left of the axis X—X. The disc 15 is formed at its periphery with a vertical erected cylindrical flange 17, the disc 16 having a similar depending flange 18 which bends radially outwards to form a radial flange 19 throughout the periphery of the disc 16. This radial flange 19 has securely fixed thereto a circular row of hubs, such as 20, depending from the flange and equally angularly spaced about the axis X—X. The motor unit driving the shaft 13 for the pinion 12 includes a governor adapted to control the motor unit in order to rotate the shaft 10 step by step steadily through a fraction of a revolution matching the angular interval between the hubs 20. The hubs 20 are each bored vertically through, the resulting bore 21 being hereafter referred to as "transfer chamber." The transfer chambers in all the hubs 20 are obviously equally angularly spaced about the axis X—X. The cross-sectional area of each transfer chamber is preferably circular, the peripheral walls of the chamber being possibly polished. The top end of each transfer chamber opens on an annular crest 22 circularly extending on the top face of the radial flange 19.

Reference 23 denotes a component of an extrusion press, having bored therethrough a passage 24 merging into a passage 25 in the extrusion nozzle 26 secured to the press 23 by means of a tapped collar 27. As distinct from constructions known heretofore in the branch, the cross-sectional area of the passage 25 is merely circular instead of annular, its diameter equalling the diameter of the transfer chamber 21. The free end of the nozzle 26 is downwardly curved immediately over the crest 22 and ends by a profile complementary to the crest profile so that on rotation of the table 14, the free end of the nozzle tightly slides on the crest and the opening of the passage 25 can be sequentially aligned with the consecutive transfer chambers, such alignment occurring every time the table 14 stops rotating about the axis X—X. Of course, the circular row of the transfer chambers 21 is concentrical with the axis X—X.

The peripheral outer face of the flange 17 on the disc 14 has secured thereto over each transfer chamber 21 a hydraulic or pneumatic cylinder 30 having a vertical axis in which a piston 31 is mounted for axial displacement. The cylinder is of the double-acting type, so that by suitably adjusting the liquid flow to the cylinder, the piston 31 can be moved upwards and downwards. The piston 31 has a stem 32 securedly fixed thereto, said stem being hollow to provide a second fluid pressure cylinder 33 axially aligned with the cylinder 30 and its respective transfer chamber 21. The cylinder 33 is of the double-acting type also, so that a piston 34 movable therein can be moved upwards and downwards. The chamber in the cylinder 33 extends downwardly to a cylindrical passage 35 aligned with the transfer chamber 21 and equalling the latter in cross-sectional area. The passage 35 has mounted for axial displacement therein the stem 36 fast with the piston 34, said stem being axially bored at 37 throughout its length and ending below by a needle 38. The axial length of the passage 35 is such that the needle 38 can be fully accommodated thereby when the piston 34 is in its highest position. The stem 32 of the piston 31 has a lower transverse face 39 the profile of which is complemental to the profile of the crest 22 so that, on downward displacement of the piston 31, the face 39 of the stem 32 accurately matches the crest 22, the passage 37 and needle 38 on the stem 36 being accurately aligned with the longitudinal axis of the transfer chamber 21. The stem 32 together with its face 39 shall be jointly referred to hereafter as "shutter." In the top position of the piston 31 the face 39 is spaced from the crest 22 by a sufficient extent for the extrusion nozzle 26 to freely extend between said components.

Each transfer chamber is provided below with a sectional mould 40, comprising two mould halves 41, 42 which, in their closed position jointly confine a moulding recess 43 opening upwardly in alignment with the transfer chamber 21. The movements of the two mould halves are effected by means of fluid pressure jacks 44 and piston rods 45 thereof. The mould halves 41, 42 and jacks 44 are supported by a bracket 46, securedly fixed to the table 14 by means of bolts 47 which also connect together both discs 15, 16.

The devices for delivery of fluid pressure to the cylinders 30, 33 and jacks 44 shall not be described in detail herein, for such means are assumed to be known from the prior art, hence easily adapted to this apparatus, more particularly considering its operational steps to be described hereafter. The hubs 20 including the transfer chamber 21 are each surrounded by a heating member 50, such as an electric resistance fed by means which are not particularly illustrated since they are known to the men of the art and can be designed in the most convenient manner according to circumstances.

The individual steps of the improved method shall now be described together with the manner of operating the above described apparatus.

The device is assumed to have reached the position shown in Figure 1 upon a prior angular displacement of the table 14 about the axis X—X. In this position the pistons 31, 34 are in their topmost position, the mould halves being fully open (wider open than shown in Figure 1), the outlet of the extrusion passage 25 in the nozzle 26 being aligned with the transfer chamber 21 in one of the hubs 20. Since, as mentioned above, the table 14 is intermittently rotated, the device is assumed to be at standstill in the position shown and described.

Moreover, the extrusion press, the components of which 23, 26 and 27 are shown, is assumed to be operative, so that the softened thermoplastic material reaches the passages 24, 25. Under these conditions, the first step of the method consists in extruding from the nozzle 26 a volume of the material into the transfer chamber 21. This material flows downward within the transfer chamber to a certain level, such as indicated by the dash-line meniscus, visible in Figure 1.

It is submitted at this stage that, even with a highly fluid material, such as polyamide resins, the downward movement of the material within the chamber 21 is merely effected by the pressure from the extrusion press and not by the weight of the material itself which, on ceasing of pressure, would easily be balanced by the surface tension at the region of the meniscus as well as adherence, whether small, to the walls of the transfer chamber 21. It may therefore be stated that the lump of material is supported at this stage over most of its outer surface, so that any discontinuity within the material is avoided and any risk of breakage of the lump of material by the effect of its own weight is prevented. As the extruded lump in the chamber 21 reaches a predetermined volume, the table 14 is rotated through an angular step. In order to effect this subordinate indexing rotation it will be sufficient to provide in the motor means a timed control, preferably of an adjustable type, so that the period of standstill of the table 14 is sufficient and does not exceed the period of time required for extruding a given volume of material into the chamber 21.

On indexing of the table 14 the front face of the nozzle 26 slides on the crest 22 in tight engagement with the latter, so that the volume of material extruded into the chamber 21 is severed from the remaining material in the passage 25 and is no longer subjected to the pressure from the press. The lump of material is therefore self-supporting in the chamber 21 by effect of adherence to its walls and of the meniscus, as mentioned above. Considering that the hub 20 is heated at the same time by the means 50, the lump extruded into the chamber 21 steadily maintains its fluidity properties necessary for further processing thereof.

Upon the angular indexing step of the table 14, the nozzle 26 comes into alignment with the next transfer chamber and the operations described above are repeated, and so on. It will be obvious that extrusion of a lump of material in each transfer chamber is effected at a relatively high rate of speed, mostly less than one second, so that the output per hour of the improved device can be reckoned on at least 3600 articles, considering also the periods of time required by the table 14 for performing its indexing movements, which do not as a rule exceed 2–3 tenths of a second, provided the circumferential spacing of the transfer chambers 21 is as small as possible consistently with the overall size of the cylinders 30 associated with the individual chambers. Considering also the further description, it will be seen that the output per hour of the improved device merely depends upon the injection periods of time for the individual lumps into the individual transfer chambers as well as the periods of time required for intermittent indexing movements of the table.

Reverting now to the first lump injected into the chamber 21, it will be seen that upon angular displacement of the table 14, the chamber 21 is now open at its top beneath the lower front face 39 of the shutter 32 forming the rod of the piston 31.

By feeding the pressure fluid to the cylinder 30, the piston 31 is moved downwardly, so that the face 39 comes into sealed engagement with the crest 22, as shown in Figure 2, that is with the region surrounding the top end of the chamber 21. This figure clearly shows the lump 60 in the transfer chamber 21. Directly thereupon feed of pressure fluid to the cylinder 33 moves the piston 34 downwardly, so that the hollow needle 38 on the rod 36 of the piston 34 enters the lump 60 without fully piercing it and, as the rod 36 moves further downward, the latter forces the lump 60 downwardly outside the transfer chamber 21. The downward movement of the piston 34 stops as soon as the portion 60 is flush with the moulding recess in the mould 40 which has heretofore been kept open.

On analysing the movement of the rod 36 together with the needle 38 is will be seen that the needle at first enters the lump 60 while the latter is supported from the outside by the walls of the transfer chamber and the meniscus mentioned with reference to Figure 1. Considering that the needle 38 is relatively cool, its penetration into the lump 60 of hot softened thermoplastic material is effected without any appreciable sticking of material to the needle, all the more so that, in accordance with the technique known from other methods in this field, the penetrating movement of the needle can be made sharp enough. When the whole needle has penetrated the lump 60, the latter is expelled from the transfer chamber by action of the rod 36 which on account of its outer diameter substantially equalling the bore of the chamber 21 acts as a piston and expels the whole thermoplastic material downwardly to the desired level, such as may be determined by abutment of the piston 34 against the lower bottom of the cylinder 33, as will be seen in Figure 3. In the position shown in this figure, the lump 60 is now free at its outer periphery but is supported from the inside by the needle 38, so that the softened thermoplastic material is not dangerously liable to break. On considering as axial size of the recess 43 its dimension in a direction parallel with the axis X—X, that is in a vertical direction, it is essential to note that the length of the needle 38 extends over a substantial portion of the axial dimension of said recess 43. It should further be noted that the needle 38 has a cylindrical base 38a by means of which it is connected with the rod 36 (Figure 4), said base having an outer diameter smaller than the diameter of the rod 36, so that the material of the lump 60 also covers said base 48a to the shoulder 36a on the stem 36. The two mould halves 41, 42 are shaped for juxtaposition in a closed condition along a flat surface with the exception of the top regions facing the base 38a of the needle 38, which are recessed to enclose and clamp between them said base 38a with the material adherent thereto on closure of the mould.

As soon as the lump 60 has been forced to the region between the two mould-halves 41, 42 in the position shown in Figure 3, a suitable control device automatically closes the mould, so that the components take their relative positions shown in Figure 4. The lump 60 is thereby confined within the moulding recess 43, except at an end top region which is maintained clamped air-tight about the base 38a of the needle 38. The further step of the method comprises henceforth blowing the expansion air through the passage 47 into the stem 36 and needle 38, thereby to expand the lump 60 and cause the thermoplastic material to adhere to the walls of the moulding recess 43. This step is a relatively delicate one, inasmuch as the initial pressure of the air flown-in should be low enough so as not to pierce the region 60a of the lump situated at the needle tip. With this pressure adjustment the air enters zones opposing a lowest resistance, that is the interface needle-thermoplastic material and gradually removes the material from the tip and peripheral surface of the needle. The action of compressed air is now comparable with an insinuation of the latter between the surfaces of the needle and the material, except the region clamped about the base 38a of the needle. Upon removal of the material from the needle the pressure of the blowing air can be raised to the values normally applied in the manufacture of hollow articles by means of a hollow needle, in a manner known per se to the men of the art.

It should be noted that the above described operations and processes occur while the table 14 rotates about the axis X—X, whereby all movements can be automatically effected, such as by means of a stationary cam or an electric selector-switch or the like in a manner which will be easily understood and is well known from other apparatus employed in this field, wherein certain operations are controlled dependently upon the angular position reached by the table on rotation. With controls of this kind supply of the blowing air to the needle 38 can easily be maintained, the moulds being advantageously cooled such as by water circulation over an angular path of the table sufficient for the material having expanded in the mold to set to a sufficient extent for stripping it from the mold. Generally, this path will be of the order of 270–300° of rotation of the table.

On expansion and setting of the material in contact with the walls of the moulding recess, the mould comes in nearest proximity to the stripping station, wherein, without opening the mould, the fluid flow is reversed in the cylinders 30, 33 to restore the pistons 31, 34 to their initial position shown in Figure 1. Since the mould is closed the hollow article just formed slips off the needle 38 and remains in the mould. On a further angular step of the table 14 the mould reaches the stripping position in which the mould is opened and the finished article freely falls into a collecting basket or the like. If desired, the stripping station can be preceded by a deburring station at which a blade is moved over the face 40a of the mould in order to sharply cut away the burr 60b (Figure 4). The blade can be permanently mounted on the frame of the apparatus, whereby deburring is effected as the moulds travel past the blade. This advantageous arrangement is easily possible through the fact that the angular movements of the table are effected sharply, whereby the deburring is quite sharp.

It will be seen that the invention permits of satisfactorily working even relatively fluid thermoplastic materials, generally on account of the fact that the extruded portion is temporarily supported from the outside in the transfer chamber 21, thereafter threaded on an internal support 38, the outer support being removed, and finally expanded to loosen it from its internal support.

It is essential to note that the term "lump" as employed in the specification is intended to define a volume of material in the form of a section of strand or solid bar issuing from a nozzle. This strand or bar may be of any desired cross-sectional shape; however, for obvious reasons a circular cylindrical cross-sectional shape is preferred, such as results under these conditions by the action of forces such as viscosity and surface tension. On the other hand, it is clear that a tubular blank would be unsuitable for the purposes of this invention.

It will be understood that the embodiment of the invention described above and shown on the drawing should not be understood as a limitation, and various modifications can be made without departing from the scope defined by the appended claims.

What I claim is:

1. Apparatus for manufacturing a hollow article of a thermoplastic material comprising a rotary table, a circumferential flange on the table, a vertically extending cylindrical open-ended transfer chamber supported from the flange, a sectional mould supported from the table beneath the transfer chamber, means for opening and closing the mould in axially aligned condition with the chamber, reciprocable shutter member supported from the table over the chamber, the said shutter member being vertically movable between a position in which the member is spaced from the upper end of the chamber and a position in which the member provides a seal around the upper end of the chamber, a piston member axially reciprocable in the shutter member, a hollow needle extending from the piston member towards the transfer chamber, the said piston member being vertically movable in axial alignment with the chamber between a position in which the needle is axially spaced from the chamber and a position in which the piston member extends through the chamber and in which the needle projects into the mould, means for delivering an expansion fluid through the needle, a stationary extrusion nozzle for the material projecting between the transfer chamber and shutter member, and a free end face on the nozzle in slidable sealed engagement with a section of the flange supporting the chamber.

2. In the apparatus as claimed in claim 1, the said reciprocable shutter member comprising a double-acting fluid pressure cylinder fixed on the table in axial alignment with the chamber, a piston reciprocable in the cylinder, a piston rod fast with the said piston having its opposite end sections axially protruding from the cylinder, a face on the lower end of the piston rod capable of providing the seal around the upper end of the chamber in the said second named position of the shutter member, and an axial bore in the piston rod accommodating the said piston member axially slidable in the shutter member.

3. In the apparatus as claimed in claim 2, means for reciprocating the piston member in the shutter member comprising a double acting cylinder axially arranged within the piston rod, and a piston fitted on the piston member for operation in the last named cylinder.

4. In the apparatus as claimed in claim 1, heating means surrounding the transfer chamber, thereby to maintain hot the chamber during operation.

5. In the apparatus as claimed in claim 1, an enlarged base connecting the needle to the piston rod, and jaw means integral with the sectional mould capable of clamping on the enlarged base a region of the lump fitted on the needle.

6. In a method of manufacturing a hollow article of a thermoplastic material by blowing and expanding the material in a softened condition within a sectional mould defining the external shape of the article, the steps of placing a cylindrical open-ended chamber axially aligned with and adjacent to an extrusion orifice for the material, extruding a volume of the material in a softened condition from the extrusion orifice into the chamber, displacing the chamber transversely of the extrusion orifice thereby separating the extruded volume of the softened thermoplastic material from its parent mass in the orifice and thereby obtaining a lump of the softened thermoplastic material supported in the chamber by the circumferential wall only of the latter, fitting into the lump a hollow inner support by moving the latter axially of the chamber, then continuing the axial movement of the support thereby to expel the lump from the chamber while fitted on the support, closing the sectional mould over the lump to confine the lump in the mould, and delivering an expanding fluid through the support thereby to expand the lump within the mould.

References Cited in the file of this patent

UNITED STATES PATENTS

| | | |
|---|---|---|
| 613,096 | Vernay | Oct. 25, 1898 |
| 2,317,763 | Hall | Apr. 27, 1943 |
| 2,789,312 | Borer | Apr. 23, 1957 |
| 2,834,154 | Koob | May 13, 1958 |

FOREIGN PATENTS

| | | |
|---|---|---|
| 404,308 | Great Britain | Dec. 29, 1933 |